US 9,767,433 B2

United States Patent
Kunkat et al.

(10) Patent No.: US 9,767,433 B2
(45) Date of Patent: *Sep. 19, 2017

(54) COMMUNICATION STATION FOR COMMUNICATION WITH TRANSPONDERS AND FURTHER COMMUNICATION STATIONS WITH THE AID OF DIFFERENT PROTOCOLS

(71) Applicant: NXP B.V., Eindhoven (NL)

(72) Inventors: Holger Kunkat, Neumuenster (DE); Reinhard Meindl, Graz (AT); Stefan Posch, Eggersdorf (AT); Klemens Breitfuss, Voitsberg (AT)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,420

(22) Filed: Oct. 17, 2016

(65) Prior Publication Data

US 2017/0032312 A1  Feb. 2, 2017

Related U.S. Application Data

(63) Continuation of application No. 10/507,538, filed as application No. PCT/IB03/00594 on Feb. 17, 2003, now Pat. No. 9,471,818.

(30) Foreign Application Priority Data

Mar. 13, 2002  (EP) .................... 02100244

(51) Int. Cl.
*G06Q 10/08* (2012.01)
*G06K 7/00* (2006.01)
(Continued)

(52) U.S. Cl.
CPC ......... *G06Q 10/087* (2013.01); *G06K 7/0008* (2013.01); *G06K 7/10297* (2013.01); *G06K 17/0022* (2013.01); *G06K 19/0723* (2013.01)

(58) Field of Classification Search
CPC .. G06K 7/0008; G06K 19/06; G06K 19/0723; H04Q 5/22
See application file for complete search history.

(56) References Cited

U.S. PATENT DOCUMENTS

| 5,051,741 A | 9/1991 | Wesby |
| 5,610,947 A | 3/1997 | Balasubramanian et al. |

(Continued)

FOREIGN PATENT DOCUMENTS

| FR | 2776148 | 9/1999 |
| WO | 0026686 A2 | 5/2000 |
| WO | 0243185 | 5/2002 |

OTHER PUBLICATIONS

International Search Report, PCT/IB2003/000594/ May 22, 2003.

*Primary Examiner* — Nabil Syed

(57) ABSTRACT

A communication station is suitable for contactless communication with transponders and with further communication stations and has a first protocol-executing circuit and a second protocol-executing circuit, the first protocol-executing circuit being designed to effect communication between the communication station and transponders under a station/transponder protocol and the second protocol-executing circuit being designed to effect communication between the communication station and further communication stations under a station/station protocol.

12 Claims, 1 Drawing Sheet

(51) Int. Cl.
    *G06K 7/10*         (2006.01)
    *G06K 19/07*       (2006.01)
    *G06K 17/00*       (2006.01)

(56) References Cited

U.S. PATENT DOCUMENTS

| | | |
|---|---|---|
| 5,686,902 A | 11/1997 | Reis et al. |
| 5,804,810 A | 9/1998 | Woolley et al. |
| 5,929,778 A | 7/1999 | Asama et al. |
| 6,034,603 A | 3/2000 | Steeves |
| 6,058,374 A | 5/2000 | Guthrie et al. |
| 6,130,896 A | 10/2000 | Lueker et al. |
| 6,362,737 B1 | 3/2002 | Rodgers et al. |
| 6,505,771 B1 | 1/2003 | Leverne |
| 6,577,229 B1 | 6/2003 | Bonneau et al. |
| 2002/0024421 A1 | 2/2002 | Kang |
| 2003/0007473 A1 | 1/2003 | Strong et al. |

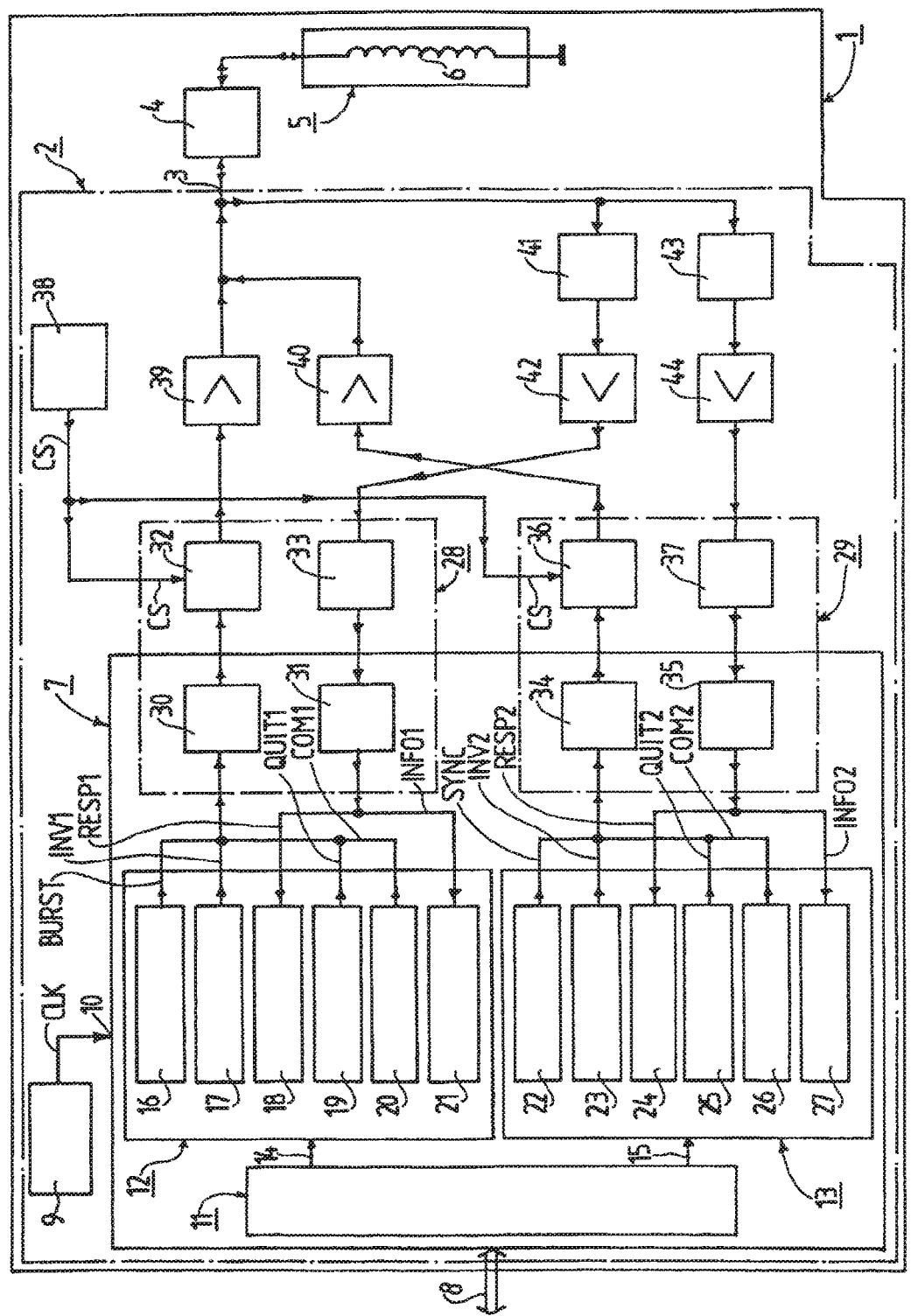

COMMUNICATION STATION FOR COMMUNICATION WITH TRANSPONDERS AND FURTHER COMMUNICATION STATIONS WITH THE AID OF DIFFERENT PROTOCOLS

This application is a continuation of U.S. patent application Ser. No. 10/507,538, filed on Sep. 13, 2004, issued as U.S. Pat. No. 9,471,818, which is the National Stage of International Application No. PCT/IB03/00594, filed Feb. 17, 2003, which claims benefit of European Patent No. 02100244.9, filed Mar. 13, 2002, which are all incorporated herein by reference.

The invention relates to a communication station that is suitable for contactless communication with transponders and with further communication stations.

The invention further relates to an integrated circuit for a communication station, which station is suitable for contactless communication with transponders and with further communication stations.

A communication station of this kind is known from U.S. Pat. No. 5,929,778 A. In this patent, it is explained that a communication station is able to communicate with transponders and with further communication stations by electromagnetic means and that, in the course of the communication processes that take place for this purpose, a protocol has to be observed, although nothing more detailed is said as to the type and nature of the protocol that has to be followed.

An object that the invention has set for itself is to improve a communication station that is suitable for contactless communication with transponders and with further communication stations in comparison with the communication station known from U.S. Pat. No. 5,929,778 A and to provide a communication station and an integrated circuit for a communication station by means of which clearly and precisely distinguishable communication processes can be obtained between the communication station and transponders on the one hand and between the communication station and further communication stations on the other hand.

To achieve the object outlined above, features according to the invention are provided in a communication station according to the invention such that a communication station according to the invention can be characterized in the manner specified below, namely:

A communication station that is suitable for contactless communication with transponders and with further communication stations and that has first protocol-executing means designed to handle a station/transponder protocol, with the aid of which first protocol-executing means communication can be effected between the communication station and at least one transponder while observing the station/transponder protocol, and that has second protocol-executing means designed to handle a station/station protocol that differs from the station/transponder protocol in respect of at least one protocol parameter, with the aid of which second protocol-executing means communication can be effected between the communication station and at least one further communication station while observing the station/station protocol.

To achieve the object outlined above, features according to the invention are provided in an integrated circuit according to the invention such that an integrated circuit according to the invention can be characterized in the manner specified below, namely:

An integrated circuit for a communication station that is suitable for contactless communication with transponders and with further communication stations, which integrated circuit has first protocol-executing means designed to handle a station/transponder protocol, with the aid of which first protocol-executing means communication can be effected between the communication station and at least one transponder while observing the station/transponder protocol, and which integrated circuit has second protocol-executing means designed to handle a station/station protocol that differs from the station/transponder protocol in respect of at least one protocol parameter, with the aid of which second protocol-executing means communication can be effected between the communication station and at least one further communication station while observing the station/station protocol.

What is achieved, in a relatively simple way and by using relatively simple means, by the provision of the features according to the invention is that, on the one hand a communication process between the communication station according to the invention and transponders designed to co-operate therewith, and on the other hand a communication process between the communication station according to the invention and further communication stations designed to co-operate therewith, can be easily and satisfactorily distinguished from one another because the distinction can, for example, be made with the aid of protocol parameters that are provided at the beginning of the station/transponder protocol and at the beginning of the station/station protocol and that differ from one another. Another particularly important advantage with a communication station according to the invention is afforded by the fact that, by using or observing two different protocols, namely the station/transponder protocol and the station/station protocol, it is possible to select and put into operation, for the given communication process between the communication station according to the invention and transponders on the one hand and between the communication station according to the invention and further communication stations on the other hand, a protocol that in each case is optimized, thus enabling communication processes to be performed that are optimized from the point of view of, for example, short communication time-spans or communication with the largest possible number of communications partners.

It has proved highly advantageous if, in addition, the features specified in claims 2 and 6 are provided in a communication station according to the invention and in an integrated circuit according to the invention, respectively. What is advantageously achieved in this way is that, when the communication station is communicating with transponders under the station/transponder protocol, care is taken to see that the transponders are supplied with adequate energy at the start of any such communication, and that, when the communication station according to the invention is communicating with further communication stations under the station/station protocol, care is taken to see that the data processing at the relevant communication stations is satisfactorily synchronized at the start of any such communication.

It has also proved highly advantageous if, in addition, the features specified in claims 3 and 7 are provided in a communication station according to the invention and in an integrated circuit according to the invention, respectively. What is achieved in this way is that, when the communication station according to the invention is communicating with at least one further communication station under the station/station protocol, energy consumption that is as low as possible is all that is required at the communication station according to the invention, which is a great advantage, particularly when the communication station according to the invention is contained in a portable unit or in a movable or transportable device and, this being the case, is supplied from a rechargeable or non-rechargeable battery, in which case the design according to the invention then ensures that the battery will have a long endurance.

It has also proved highly advantageous if, in addition, the features specified in claims 4 and 8 are provided in a communication station according to the invention and in an integrated circuit according to the invention, respectively. What is achieved in this way is that the communication station according to the invention is designed in an advantageously satisfactory way both for, on the one hand, communication with the largest possible number of transponders and, on the other hand, for making a communications connection to further communication stations as quickly as possible.

These and other aspects of the invention are apparent from and will be elucidated with reference to the embodiments described hereinafter, though the invention is not limited to these embodiments.

The invention will be further described with reference to one example of embodiment shown in the drawing, to which, however, the invention is not restricted.

In the drawings:

FIG. 1 shows, in the diagrammatic form of a block circuit diagram, a part of a communication station according to the invention that is essential in the present connection.

FIG. 1 shows a communication station 1. The communication station 1 is suitable for contactless communication with transponders (not shown) and with further communication stations (not shown), the transponders and the further communication stations being of a design suitable for communicating with the communication station 1.

The communication station 1 contains an integrated circuit 2 that is used to implement a large number of electrical modules and components, although it is only the modules and components that are essential in the present connection that are shown in FIG. 1. Connected to a terminal 3 of the integrated circuit 2 are matching means 4 by means of which output stages and input stages of the integrated circuit 2 are matched to transmission means 5 of the communication station 1. The transmission means 5 contain a transmission coil 6 by means of which communication can be effected electromagnetically between the communication station 1 and transponders suitable for the purpose and between the communication station 1 and further communication stations suitable for the purpose. In communication of this kind, transmission signals are both transmitted, i.e. sent, from the communication station 1 to the transponders or to the further communication stations and are transmitted from the transponders or the further communication stations to the communication station 1, i.e. are received by the communication station 1.

The integrated circuit 2 contains a microprocessor 7. A large number of resources and functions are or can be implemented by means of the microprocessor 7, although it is only the resources and functions that are essential in the present connection that will be considered in detail here. In place of the microprocessor 7, the communication station 1 may also contain a hard-wired logic circuit. The microprocessor 7 is connected by a bus link 8 to a host computer that is not shown in FIG. 1. The microprocessor 7 may also be connected to one or more other microprocessors by the bus link 8. The integrated circuit 2 contains a clock-signal generator 9 by means of which a clock signal CLK can be generated, which clock signal CLK is fed to an input 10 of the microprocessor 7 for known purposes. The clock-signal generator 9 may have a quartz oscillator that is provided off the integrated circuit 2.

Communication-mode selecting means 11 are implemented by means of the microprocessor 7. In the present case, a choice can be made between two modes of communication by means of the communication-mode selecting means, namely between a first mode of communication and a second mode of communication, communication being carried out between the communication station 1 and transponders in the first mode of communication and communication being carried out between the communication station 1 and further communication stations in the second mode of communication. The communication-mode selecting means 11 are designed to be controllable, in a way that is not shown, so that deliberate control can be exerted on the communication-mode selecting means 11. The control of the communication-mode selecting means 11 may be performed by, for example, the host computer over the bus link 8. Control of the communication-mode selecting means 11 may also be performed by means of an input keyboard, however. Or again, control of the communication-mode selecting means 11 may be performed by means of a so-called voice-operated control device, that is to say by spoken control commands.

It should first be made clear that communication in the first mode of communication takes place under a station/transponder protocol using at least one transmission parameter and that communication in the second mode of communication takes place under a station/station protocol using at least one different transmission parameter. To enable this to be done, the integrated circuit 2 has the resources elucidated below.

First protocol-executing means 12 and second protocol-executing means 13 are implemented by means of the microprocessor 7. The two protocol-executing means 12 and 13 can be activated by means of the communication-mode selecting means 11 via control connections 14 and 15.

The first protocol-executing means 12 comprise energy-supply signal generating means 16, first inventorying-signal generating means 17, first response-signal detecting means 18, first acknowledgement-signal generating means 19, first command-signal generating means 20 and first information-signal detecting means 21. An energy-supply signal BURST can be generated by means of the energy-supply signal generating means 16. A first inventorying signal INV1 can be generated by means of the first inventorying-signal generating means 17. A first response signal RESP1 can be detected by means of the first response-signal detecting means 18. A first acknowledgement signal QUIT1 can be generated by means of the first acknowledgement-signal generating means 19. First command signals COM1 can be generated by means of the first command-signal generating means 20, which command signals may be a write command signal or a read command signal or many other command signals. First information signals INFO1 may be detected by means of the first information-signal detecting means 21, and these information signals may be signals read from a memory or many other information signals.

Synchronizing-signal generating means 22, second inventorying-signal generating means 23, second response-signal detecting means 24, second acknowledgement-signal generating means 25, second command-signal generating means 26 and second information-signal detecting means 27 being implemented by means of the second protocol-executing means 13. A synchronizing signal SYNC can be generated by means of the synchronizing-signal generating means 22.

A second inventorying signal INV2 can be generated by means of the second inventorying-signal generating means 23. A second response signal RESP2 can be detected by means of the second response-signal detecting means 24. A second acknowledgement signal QUIT2 can be generated by means of the second acknowledgement-signal generating means 25. Second command signals COM2 can be generated by means of the second command-signal generating means 26, which command signals may be read command signals or write command signals or many other command signals. Second information signals INFO2 may be detected by means of the second information-signal detecting means 27, and these information signals may be signals read from a memory or other station information signals.

The first protocol-executing means 12 are designed to handle the station/transponder protocol. With the aid of the first protocol-executing means 12, communication can be effected between the communication station 1 and at least one transponder while observing the station/transponder protocol. One special attribute of the first protocol-executing means 12 is that they have the energy-supply signal generating means 16, which are designed to generate the energy-supply signal BURST each time the station/transponder protocol starts to be handled. A further special attribute of the first protocol-executing means 12 is that they are arranged to handle a station/transponder protocol, which protocol is designed with a view to communication with the largest possible number of transponders during a protocol process.

The second protocol-executing means 13 are designed to handle the station/station protocol. By means of the second protocol-executing means 13, communication can take place between the communication station 1 and at least one further communication station while observing the station/station protocol. The second protocol-executing means 13 are advantageously so produced in this case that they have the synchronizing-signal generating means 22 that are designed to generate the synchronizing signal SYNC each time the station/station protocol starts to be handled. The second protocol-executing means 13 are advantageously arranged in the case of the communication station 1 to handle a station/station protocol that is designed with a view to causing only the least possible energy consumption at the communication station 1 when communicating with at least one further communication station. The arrangement is also advantageously such in the present case that the second protocol-executing means 13 are designed to handle a station/station protocol that is arranged to make a communications connection to at least one further communication station as quickly as possible.

In the case of the communication station 1, the essential situation that is advantageously brought about is that the station/transponder protocol that is to be handled by means of the first protocol-executing means 12, and the station/station protocol that is to be handled by means of the second protocol-executing means 13, differ from one another in respect of at least one protocol parameter. In the present case, the two protocols always differ from one another in that, under the station/transponder protocol, the energy-supply signal BURST is generated each time the handling of this protocol starts and in that, under the station/station protocol, the synchronizing signal SYNC is generated each time the handling of this protocol starts. Because of this difference, the two protocols can be clearly and unmistakably distinguished from one another, which means that the communication processes carried out as a result of the handling of the different protocols can also be clearly and satisfactorily distinguished from one another. The two different protocols are also so selected in this case that if, as is possible, communication processes take place simultaneously between communication station 1 and transponders on the one hand and between communication station 1 and further communication stations on the other hand, there can be no mutual influences.

The station/transponder protocol may be a known protocol such as one of the protocols that are defined in international standards such as in international standards ISO 14443 or ISO 15693, or in standard ISO 18000 that is currently being drafted.

The integrated circuit 2 comprises first signal-processing means 28 for processing signals generated by or to be analyzed by the first protocol-executing means 12. The integrated circuit 2 also comprises second signal-processing means 29 for processing signals generated by or to be analyzed by the second protocol-executing means 13. By means of the first signal-processing means 28, the signals that are generated or to be analyzed by means of the first protocol-executing means 12 can be processed in the course of communication between the communication station 1 and at least one transponder using, in this case, two transmission parameters. By means of the second signal-processing means 29, the signals that are generated or to be analyzed by means of the first protocol-executing means 13 can be processed in the course of communication between the communication station 1 and at least one further communication station using, in this case, two different transmission parameters. When this is done, it is essential and advantageous in the present connection for the two transmission parameters for the processing of the signals by the first signal-processing means 28 and the two transmission parameters for the processing of the signals by the second signal-processing means 29 to be transmission parameters that are different from one another, a matter which will be considered in greater detail below.

The first signal-processing means 28 have first coding means 30 and first decoding means 31. The first coding means 30 are designed to process signals by a first type of coding, with this first type of coding constituting a first transmission parameter. In the present case, the first coding means 30 are designed to process the signals by a so-called Miller code. The first decoding means 31 are designed to process signals by a second type of coding, with this second type of coding constituting a second transmission parameter. In the present case, the first decoding means 31 are designed to process the signals by a so-called Manchester code in which an auxiliary carrier is used. The first coding means 30 and the first decoding means 31 may, however, also be designed each to process the signals fed to them by the so-called Manchester code or any other code, such as a so-called return-to-zero code (RZ code) for example.

The first signal-processing means 28 also have first modulating means 32 and first demodulating means 33. The first modulating means 32 and the first demodulating means 33 are designed to process the signals fed to them by a first type of modulation. In the present case, the first modulating means 32 are formed by amplitude-modulation means and the first demodulating means 33 are formed by amplitude-demodulation means, which means that the first modulating means 32 and the first demodulating means 33 are designed to process signals by amplitude modulation as a first type of modulation. What is involved here is so-called amplitude shift keying (ASK), in which case it may be 10% ASK, 12% ASK, 30% ASK or 100% ASK or even other ASK modulations. It is not, however, essential for the first modulating means 32 and the first demodulating means 33 to be designed to process signals by amplitude modulation and they could also be designed to process signals by, for example, phase modulation.

The second signal-processing means 29 have second coding means 34 and second decoding means 35. The second coding means 34 and the second decoding means 35 are designed to process the signals fed to them by a third type of coding as a transmission parameter. In the present case, the second coding means 34 and the second decoding means 35 are designed to process the signals fed to them by a so-called NRZ code (non-return-to-zero code), which means that this NRZ code thus forms a further transmission parameter that is used at communication station 1. The second coding means 34 and the second decoding means 35 may, however, also be designed each to process the signals fed to them by some other code, such as the so-called FM zero code (FM0 code), for example.

The second signal-processing means 29 also have second modulating means 36 and second demodulating means 37. The second modulating means 36 and the second demodulating means 37 are designed to process the signals fed to them by a second type of modulation. In the present case, the second modulating means 36 are formed by phase-modulation means and the second demodulating means 37 are formed by phase-demodulation means. In this case, the phase-modulation means provided as the second modulating means 36 and the phase-demodulation means provided as the second demodulating means 37 are designed to process the signals fed to them by the so-called BPSK method (the binary phase shift keying method). The second modulating means 36 and the second demodulating means 37 may, however, also be designed to process the signals fed to them by some other type of modulation, such, for example, as by frequency modulation or simple phase modulation or even amplitude modulation.

The integrated circuit 2 comprises a carrier-signal generator 38 by which a carrier signal CS can be generated, that is fed to the first modulating means 32 and the second modulating means 36 for modulation purposes.

Designing the first modulating means 32 as amplitude-modulation means provides the substantial advantage that the amplitude-modulated transmission signals that can be generated by means of the first modulating means 32 and that are transmitted to transponders can be demodulated at the given transponder easily and with only a low energy demand.

Designing the second modulating means 36 as phase-modulation means affords the substantial advantage in the present case that the transmission signals that can be generated by means of the second modulating means 36 and that are transmitted to further communication stations ensure that there is a high signal-to-noise ratio and also require only a relatively small amount of transmitting energy, which means that when this is the case the energy consumption required at the communication station 1 for the second modulating means 36 is only low, which is a great advantage, particularly when the communication station 1 is part of a portable unit that is supplied with power from at least one rechargeable or non-rechargeable battery, because this gives the power-supply means concerned a long endurance.

By selecting different types of coding and different type of modulation, i.e. different transmission parameters, on the one hand for communication under the station/transponder protocol between the communication station 1 and transponders and on the other hand for communication under the station/station protocol between the communication station 1 and further communication stations, it is advantageously ensured that the communication processes concerned can, if desired, take place simultaneously or at least partly simultaneously yet entirely without any influence on or interference with one another.

Signals processed in the first signal-processing means 28 by the first coding means 30 and the first modulating means 32 are fed to first amplifier means 39 and from the first amplifier means 39 are passed via the terminal 3 to the matching means 4 and then on to the transmission means 5.

Signals processed in the second signal-processing means 29 by the second coding means 34 and the second modulating means 36 are fed to second amplifier means 40 and from the second amplifier means 40 are passed via the terminal 3 to the matching means 4 and then on to the transmission means 5.

Signals that are received by the transmission means 5 and fed to the matching means 4 are fed via terminal 3 to the integrated circuit 2. If these signals are signals that were transmitted to the communication station 1 in a communication between the communication station 1 and transponders, then they are filtered out by first filter means 41 and fed via third amplifier means 42 to the first demodulating means 33 of the first signal-processing means 28. The gain factor of the third amplifier means 42 may even be less than one (1) in this case. If, on the other hand, the signals are signals that were transmitted to the communication station 1 in a communication between the communication station 1 and further communication stations, then they are filtered out by second filter means 43 and are fed via fourth amplifier means 44 to the second demodulating means 37 of the second signal-processing means 29.

A brief description will now be given below of a possible communication process in which the station/transponder protocol is handled and of another possible communication process in which the station/station protocol is handled, though it should be remembered that these are only possible examples.

When the station/transponder protocol is being handled, the energy-supply signal BURST is generated by means of the energy-supply signal generating means 16 each time the handling of the protocol starts, this being done for a minimum period of 1 msec. The energy-supply signal BURST is transmitted to all the transponders that are linked to the communication station 1 for communication purposes, which ensures that all the transponders are supplied with a sufficiently large amount of energy. This assumes that the transponders concerned are so-called passive transponders that do not have any power supply of their own provided by, for example, a battery. The first inventorying signal INV1 is then generated by means of the first inventorying-signal generating means 17, and as a result an inventorying procedure is started for all the transponders that are linked to the communication station 1 for communication purposes. A first response signal RESP1 is emitted by each of the transponders that are linked to the communication station 1 for communication purposes and is transmitted to the communication station 1, following which it is detected by the first response-signal detecting means 18 either that there is a clash between at least two such first response signals RESP1 from at least two transponders or that a first response signal RESP1 from only a single transponder is satisfactorily detected. A first acknowledgement signal QUIT1 that is generated by the first acknowledgement-signal generating means 19 is transmitted to each transponder that is unambiguously detected. Following acknowledgement of this kind by means of the first acknowledgement signal QUIT1, communication takes place between the communication station 1 and the transponder that has been identified and acknowledged in the given case, this communication being performed as a result of the first command signal COM1 in the given case and being either a read-out of data from the transponder concerned or a write of data to the transponder concerned and further exchanges of data. The first command signal COM1 in the given case is generated in this case by means of the first command-signal generating means 20. Data or information that is transmitted from a transponder to the communication station 1 in the course of the data-exchange operation that is carried out as a result of a first command signal COM1 of this kind, is then detected with the aid of the first information-signal detecting means 21, and this is followed by further processing of the information detected taking place in the microprocessor 7, or in the host computer that is connected to the microprocessor 7 via the bus link 8.

In a communication process under the station/station protocol, the synchronizing signal SYNC is generated by means of the synchronizing-signal generating means 22 each time the protocol is started and is then transmitted from the communication station 1 to all the further communication stations that are linked to communication station 1 for communication purposes. This ensures that the data processing operations at all the communication stations participating in a communication can be easily and quickly synchronized as a result of the synchronizing signal SYNC being analyzed at the further communication stations. This is necessary because each such communication station 1 has a quartz oscillator 9 of its own and the quartz oscillators 9 do not operate at exactly equal frequencies and this, if synchronization were not established, would result in the data processing being uncontrolled and would undoubtedly cause errors in data detection in any communication between the communication stations. Once the synchronizing signal SYNC has been generated and emitted, the process that takes place in the case envisaged here is similar to the handling of the station/transponder protocol that is described above, the signals INV2, RESP2, QUIT2, CON2 and INFO2 being processed in a similar way.

The establishment of synchronization as described above is not necessary when communication is between the communication station 1 and transponders under the station/transponder protocol, because, in the transponders involved in such communication, a clock signal is derived from the transmission signal transmitted from the communication station 1 to the transponders and synchronous operation can therefore be achieved with the help of this derived clock signal.

A further point that should be mentioned with regard to the communication station 1 described above is that the communication station 1 may also have two mutually independent matching means and two mutually independent transmission means, in which case one matching means and a transmission means connected thereto may be used in respective ones of the two possible modes of communication. In this way, it is possible to achieve transmission behavior by communication station 1 that is optimally matched to the mode of communication at the time. In the two modes of communication, the communication at the given time may be performed inductively, in which case the transmitting means will take the form of transmission coils that are coupled as in a transformer. In the event that communication is to take place at very high frequencies in the two modes of communication, the transmission means will preferably be in the form of so-called dipoles.

Another point that should be mentioned in connection with the communication station 1 described above is that the communication station 1 may take the form of a separate device or a separate unit. In a preferred application, the communication station 1 is part of a portable unit such as a mobile telephone or a so-called personal digital assistant (PDA).

What is claimed is:

1. A communication station adapted for contactless communication with transponders and with further communication stations, comprising:

first protocol-executing means configured to function according to station-transponder protocol and to effect communication between the communication station and at least one transponder while observing the station-transponder protocol, the at least one transponder being a passive transponder that does not have any power supply of its own;

second protocol-executing means configured to function according to a station-station protocol that differs from the station-transponder protocol in respect of at least one protocol parameter and to effect communication between the communication station and at least one further communication station while observing the station-station protocol;

first signal-processing means coupled to the first protocol-executing means and configured to code and decode signals for contactless station-transponder communication and to modulate and demodulate the signals for the contactless station-transponder communication;

second signal-processing means coupled to the second protocol-executing means and configured to code and decode signals for contactless station-station communication and to modulate and demodulate the signals for the contactless station-station communication; and a transmission coil coupled to the first and second signal-processing means such that the contactless station-transponder and station-station communications are performed inductively between the communication station and the at least one transponder and the at least one further communication station, wherein the first protocol-executing means have energy-supply signal generating means that are configured to generate an energy-supply signal each time the handling of the station-transponder protocol starts, and wherein the second protocol-executing means have synchronizing-signal generating means that are configured to generate a synchronizing signal each time the handling of the station-station protocol starts, the energy-supply signal for each handling of the station-transponder protocol and the synchronizing signal for each handling of the station-station protocol being transmitted through the transmission coil, the synchronizing signal being transmitted to the at least one further communication station to process subsequent signals between the communication station and the at least one further communication station.

2. The communication station of claim 1, wherein the station-station protocol is operative to cause a minimal energy consumption at the communication station when communicating with the at least one further communication station.

3. The communication station of claim 1, wherein the first protocol-executing means are configured to function according to the station-transponder protocol that is configured to communicate with a plurality of transponders, and wherein the second protocol-executing means are configured to establish a communication connection to a plurality of communication stations.

4. An integrated circuit for a communication station for contactless communication with transponders and with further communication stations, comprising:
   first protocol-executing means configured to function according to a station-transponder protocol and to effect communication between the communication station and at least one transponder while observing the station-transponder protocol, the at least one transponder being a passive transponder that does not have any power supply of its own;
   second protocol-executing means configured to function according to a station-station protocol that differs from the station-transponder protocol in respect of at least one protocol parameter and to effect communication between the communication station and at least one further communication station while observing the station-station protocol;
   first signal-processing means coupled to the first protocol-executing means and configured to code and decode signals for contactless station-transponder communication and to modulate and demodulate the signals for the contactless station-transponder communication;
   second signal-processing means coupled to the second protocol-executing means and configured to code and decode signals for contactless station-station communication and to modulate and demodulate the signals for the contactless station-station communication; and
   a terminal coupled to the first and second signal-processing means to transmit the signals to and to receive the signals from a transmission coil so that the contactless station-transponder and station-station communications are performed inductively between the communication station and the at least one transponder and the at least one further communication station,
   wherein the first protocol-executing means have energy-supply signal generating means that are configured to generate an energy-supply signal each time the handling of the station-transponder protocol starts, and wherein the second protocol-executing means have synchronizing-signal generating means that are configured to generate a synchronizing signal each time the handling of the station-station protocol starts, the energy-supply signal for each handling of the station-transponder protocol and the synchronizing signal for each handling of the station-station protocol being transmitted through the transmission coil, the synchronizing signal being transmitted to the at least one further communication station to process subsequent signals between the communication station and the at least one further communication station.

5. The integrated circuit of claim 4, wherein the station-station protocol is configured to minimize energy consumption at the communication station when communicating with the at least one further communication station.

6. The integrated circuit of claim 4, wherein the first protocol-executing means are operative to function according to the station-transponder protocol, which is adaptive to communicate with a plurality of transponders, and wherein the second protocol-executing means are configured to establish a communication connection to a plurality of communication stations.

7. A mobile device comprising:
   first protocol-executing means configured to function according to station-transponder protocol and to effect communication between the mobile device and at least one transponder while observing the station-transponder protocol, the at least one transponder being a passive transponder that does not have any power supply of its own;
   second protocol-executing means configured to function according to a station-station protocol that differs from the station-transponder protocol in respect of at least one protocol parameter and to effect communication between the mobile device and at least one communication station while observing the station-station protocol;
   first signal-processing means coupled to the first protocol-executing means and configured to code and decode signals for contactless station-transponder communication and to modulate and demodulate the signals for the contactless station-transponder communication;
   second signal-processing means coupled to the second protocol-executing means and configured to code and decode signals for contactless station-station communication and to modulate and demodulate the signals for the contactless station-station communication; and
   a transmission coil coupled to the first and second signal-processing means such that the contactless station-transponder and station-station communications are performed inductively between the mobile device and the at least one transponder and the at least one communication station,
   wherein the first protocol-executing means have energy-supply signal generating means that are configured to generate an energy-supply signal each time the handling of the station-transponder protocol starts, and wherein the second protocol-executing means have synchronizing-signal generating means that are configured to generate a synchronizing signal each time the handling of the station-station protocol starts, the energy-supply signal for each handling of the station-transponder protocol and the synchronizing signal for each handling of the station-station protocol being transmitted through the transmission coil, the synchronizing signal being transmitted to the at least one communication station to process subsequent signals between the mobile device and the at least one communication station.

8. The mobile device of claim 7, wherein the station-station protocol is operative to cause a minimal energy consumption at the mobile device when communicating with the at least one communication station.

9. The mobile device of claim 7, wherein the first protocol-executing means are configured to function according to the station-transponder protocol that is configured to communicate with a plurality of transponders, and wherein the second protocol-executing means are configured to establish a communication connection to a plurality of communication stations.

10. A communication system adapted for contactless communication, comprising:
   a plurality of transponders, the transponders being passive transponders that do not have any power supply of their own;
   a plurality of communication stations, each comprising:
      a microprocessor configured to execute a station-transponder protocol for contactless station-transponder communication with at least one of the transponders and a station-station protocol for contactless station-station communication with at least one of the communication stations, wherein the station-station protocol differs from the station-transponder protocol by at least one protocol parameter, the microprocessor being further configured to code and decode signals for the contactless station-transponder communication and to code and decode signals for the contactless station-station communication, the microprocessor being further configured to modulate and demodulate the signals for the contactless station-transponder communication and to modulate and demodulate the signals for the contactless station-station communication; and a transmission coil coupled to the microprocessor such that the contactless station-transponder and station-station communications are performed inductively between the communication station and at least one of the transponders and at least one of the communication stations, wherein the microprocessor has energy-supply signal generating means that are configured to generate an energy-supply signal each time the handling of the station-transponder protocol starts, and wherein the microprocessor has synchronizing-signal generating means that are configured to generate a synchronizing signal each time the handling of the station-station protocol starts, the energy-supply signal for each handling of the station-transponder protocol and the synchronizing signal for each handling of the station-station protocol being transmitted through the transmission coil, the synchronizing signal being transmitted to the at least one of the communication stations to process subsequent signals between the communication station and the at least one of the communication stations.

11. The communication system of claim 10, wherein each of the transponder is an RF tag.

12. The communication system of claim 10, wherein the station-station protocol is operative to cause a minimal energy consumption at each communication station when communicating with another communication station.

* * * * *